United States Patent
Matsunaga et al.

(10) Patent No.: US 9,542,599 B2
(45) Date of Patent: Jan. 10, 2017

(54) IMAGE PROCESSING DEVICE AND IMAGE PROCESSING METHOD

(71) Applicant: OMRON Corporation, Kyoto (JP)

(72) Inventors: Jumpei Matsunaga, Shiga (JP); Masayuki Kobayashi, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/833,896

(22) Filed: Aug. 24, 2015

(65) Prior Publication Data

US 2016/0063305 A1    Mar. 3, 2016

(30) Foreign Application Priority Data

Sep. 3, 2014   (JP) ................................ 2014-179390

(51) Int. Cl.
*G06K 9/00*      (2006.01)
*G06T 7/40*      (2006.01)
(Continued)

(52) U.S. Cl.
CPC ......... *G06K 9/0061* (2013.01); *G06K 9/00228* (2013.01); *G06T 5/005* (2013.01);
(Continued)

(58) Field of Classification Search
CPC ........... G06T 7/408; G06T 2207/30216; G06T 5/005; G06T 11/001; G06T 2207/10024; G06T 2207/30201; G06T 5/008; G06T 7/0081; G06K 9/00228; G06K 9/0061; H04N 1/62; H04N 1/624; H04N 2201/3274; H04N 2201/3278
(Continued)

(56) References Cited

U.S. PATENT DOCUMENTS

| | | | | | |
|---|---|---|---|---|---|
| 5,579,063 | A  * | 11/1996 | Magnante | ............ | A61B 3/1176 351/205 |
| 6,671,039 | B2 * | 12/2003 | Yoda | ................. | G01M 11/0214 356/124 |
| 6,715,878 | B1 * | 4/2004 | Gobbi | .................... | A61B 3/032 351/243 |
| 7,489,333 | B2 * | 2/2009 | Dobashi | ................... | A61B 3/14 348/78 |
| 8,523,846 | B2 * | 9/2013 | Makino | ................. | A61B 3/113 606/4 |
| 2008/0279427 | A1* | 11/2008 | Takagi | .................... | G06T 5/008 382/118 |
| 2010/0008567 | A1 | 1/2010 | Kakiuchi | | |

FOREIGN PATENT DOCUMENTS

EP       2919152 A2    9/2015
JP    2000-076427 A    3/2000
(Continued)

OTHER PUBLICATIONS

Extended European Search Report issued in corresponding European Application No. 15179983.0, mailed Jan. 5, 2016 (9 pages).
(Continued)

*Primary Examiner* — Kanjibhai Patel
(74) *Attorney, Agent, or Firm* — Osha Liang LLP

(57) ABSTRACT

An image processing device for correcting at least a portion of a face image containing a person's face, includes an image acquisition unit that acquires a face image, a region extractor that extracts a pupil region containing a pupil from the face image, a determination unit that determines a presence or absence of halation in the pupil region, a first template acquisition unit that acquires a first template image which is a correction template image, a reference color acquisition unit that acquires a reference color corresponding to the person from the face image, a second template acquisition unit that generates a second template image using the first template image and the reference color, and a correction unit that composites the second template image with at least the region in the pupil region where the halation occurred to correct the halation.

9 Claims, 9 Drawing Sheets

(51) Int. Cl.
*G06T 11/00* (2006.01)
*G06T 7/00* (2006.01)
*H04N 5/232* (2006.01)
*G06T 5/00* (2006.01)

(52) U.S. Cl.
CPC ............ *G06T 7/0081* (2013.01); *G06T 7/408* (2013.01); *G06T 11/001* (2013.01); *H04N 5/23229* (2013.01); *G06T 2207/10024* (2013.01); *G06T 2207/30201* (2013.01); *G06T 2207/30216* (2013.01)

(58) Field of Classification Search
USPC .................................................. 382/118, 167
See application file for complete search history.

(56) References Cited

FOREIGN PATENT DOCUMENTS

| | | |
|---|---|---|
| JP | 2006-040230 A | 2/2006 |
| KR | 2009-0065480 A | 6/2009 |

OTHER PUBLICATIONS

Notification of Reasons for Refusal issued in corresponding Korean Application No. 10-2015-0101597, mailed on Apr. 14, 2016 (12 pages).

\* cited by examiner

IMAGE PROCESSING DEVICE AND IMAGE PROCESSING METHOD

BACKGROUND

Technical Field

The present invention relates to image processing techniques for correcting an image having brightness defects.

Related Art

Color defects (such as the red-eye effect) where a person's eyes appear red when photographed, may occur due to the light from a strobe when the strobe on a photographing device such as a camera illuminates and takes a picture of the person. Numerous techniques have been proposed, such as revising the color tone to its original form to correcting an image including the red-eye effect. Japanese Unexamined Patent Application Publication No. 2006-040230, for instance, describes a digital camera that extracts the region in the photographed image where the red eyes occur, and corrects the color tone of the extracted region.

SUMMARY

However, the method described in Japanese Unexamined Patent Application Publication No. 2006-040230 analyzes a region besides the region containing the color defect having a normal color tone. The hue or saturation, and the brightness of the region are extracted to generate parameters used to correct the color defect region, and the correction carried out with the parameters generated.

On the other hand, halation is different from red-eye. Halation occurs when light from the strobe reflects strongly through the pupil generating a blowout in the image of the pupil. It is plausible to consider using the above-described method to correct halation. However, luminance level information is lost when halation occurs. Even if the color tone of the region with the color defect can be corrected, a region where the luminance level information is lost cannot be restored.

The luminance level information must be extrapolated to restore a region containing halation to normal. For instance, conceivably, an image of a normal-colored eye may be saved and the image pasted onto the region containing the color defect. However, when a completely different image is pasted, the brightness or color tone of the pasted image does not match the original, and the image becomes unnatural looking.

An image processing device according to one or more embodiments of the present invention corrects halation occurring inside the eyes, and provides a more natural-looking correction.

An image processing device according to one or more embodiments of the present invention corrects at least a portion of a face image containing a person's face. The image processing device includes: an image acquisition unit for acquiring a face image; a region extraction unit for extracting a pupil region containing a pupil from the face image; a determination unit for determining presence of absence of halation in the pupil region; a first template acquisition unit for acquiring a first template image which is a correction template image; a reference color acquisition unit for acquiring a reference color corresponding to the person from the face image; a second template acquisition unit for generating a second template image using the first template image and the reference color; and a correction unit for compositing the second template image with at least the region in the pupil region where the halation occurred to correct the halation.

The image processing device according to one or more embodiments of the invention extracts a pupil region from an acquired image, determines the presence or absence of halation in the pupil region, and corrects the halation. The pupil region described is a region in the image containing a pupil; typically, this is a circular region with the center point of the pupil as the center coordinate, however, the pupil region may be of any other shape so long as it contains a region where the halation may likely occur.

Halation is corrected using the first template image. The first template image is an image of a normal pupil where there are no brightness defects. Although the halation may be corrected by compositing (e.g., pasting) the first template image into the pupil region, in one or more embodiments of the invention, a reference color is used to generate a second template image from the first template image and the second template image is composited into the pupil region.

The reference color is the color corresponding to the person whose image is being corrected. According to one or more embodiments of the present invention, the reference color is taken from pixels near the location onto which the second template image will be composited. For instance, the iris color of the person whose image is being corrected may be suitably used.

According to one or more embodiments of the present invention, a second template image is created using a reference color for the person whose image is being corrected, thus yielding a more natural-looking image processing result compared to correction using the first template image having no additional processing.

Additionally, the first template image is a grayscale image. The second template acquisition unit may use the reference color to convert the first template image to a color image and use the result as the second template image.

Colorizing the first template image using the reference color thus matches the hue of the first template image to the compositing target. Converting from a grayscale image to a color image may be carried out by, for instance, calculating a relationship between R- and G-values, and R- and B-values on the basis of the RGB values of the reference color, and solving an inverse problem related to a formula for converting the RGB values into luminance values. Obviously other methods may be used to convert the luminance values to RGB values.

The image processing device according to one or more embodiments of the present invention may further include a correction value computing unit for computing a correction value for matching the luminance of the first template image to the face image on the basis of the reference color. The second template acquisition unit may adjust the luminance of the first template image using the correction value and convert the first template image into a color image.

The first template image is different from the image being corrected, and therefore when the first template image is pasted onto the image being corrected as is, the result may sometimes appear unnatural because the luminance in the first template image does not conform to the original image. For instance, only the composited region becomes brighter or darker after correction compared to the surrounding regions. Therefore, one or more embodiments of the invention not only compute a correction value that matches the luminance of the first template image to that of the face image, but also use the correction value to adjust the luminance of the first template image. Moreover, the correction value may be computed using the acquired reference color. According to one or more embodiments of the present invention, given that the first template image is composited while the luminance thereof is matched to the image being corrected, this provides a more natural-looking image processing result.

The reference color acquisition unit extracts a region from the pupil region corresponding to the iris containing no halation, and acquires a reference color from a pixel contained in this region.

The reference color may be acquired from a region corresponding to the person's iris in the image being corrected. Given that halation primarily occurs inside the iris, the color of the iris may be selected as the reference color and used to match the hue of the compositing target and the hue in the first template image.

If the region in the pupil region corresponding to the iris contains no halation, the reference color acquisition unit may extract a region corresponding to the person's skin, and acquire the reference color on the basis of the color of a pixel contained in the region.

On the other hand, if the entire iris contains halation, a reference color cannot be acquired using the above described technique because the color information for the iris is lost. Therefore, the reference color may be acquired on the basis of the color of a pixel corresponding to the person's skin. In this case, while the color of the iris cannot be reproduced, the reference color can be established on the basis of a color prevalent throughout the image and thus prevent creating an unnatural appearance due to the non-conforming hue.

Furthermore, an imaging device according to one or more embodiments of the invention includes the above described image processing device, and an imaging unit for taking an image. One or more embodiments of the present invention may be adopted in an imaging device that includes a function for correcting an image taken with the imaging unit.

One or more embodiments of the present invention may be implemented as an image processing device containing at least some of the above-mentioned elements. In addition, one or more embodiments of the invention may be implemented as an image processing method carried out by the above-mentioned image processing device. One or more embodiments of the invention may also be implemented as a program that executes the above-mentioned image processing method on a computer. Finally, the above-mentioned processing and elements may be freely combined in so far as is technically possible.

One or more embodiments of the invention provides an image processing device that corrects halation in the eyes, and carries out a more natural-looking correction.

DETAILED DESCRIPTION

Embodiment of the invention is described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
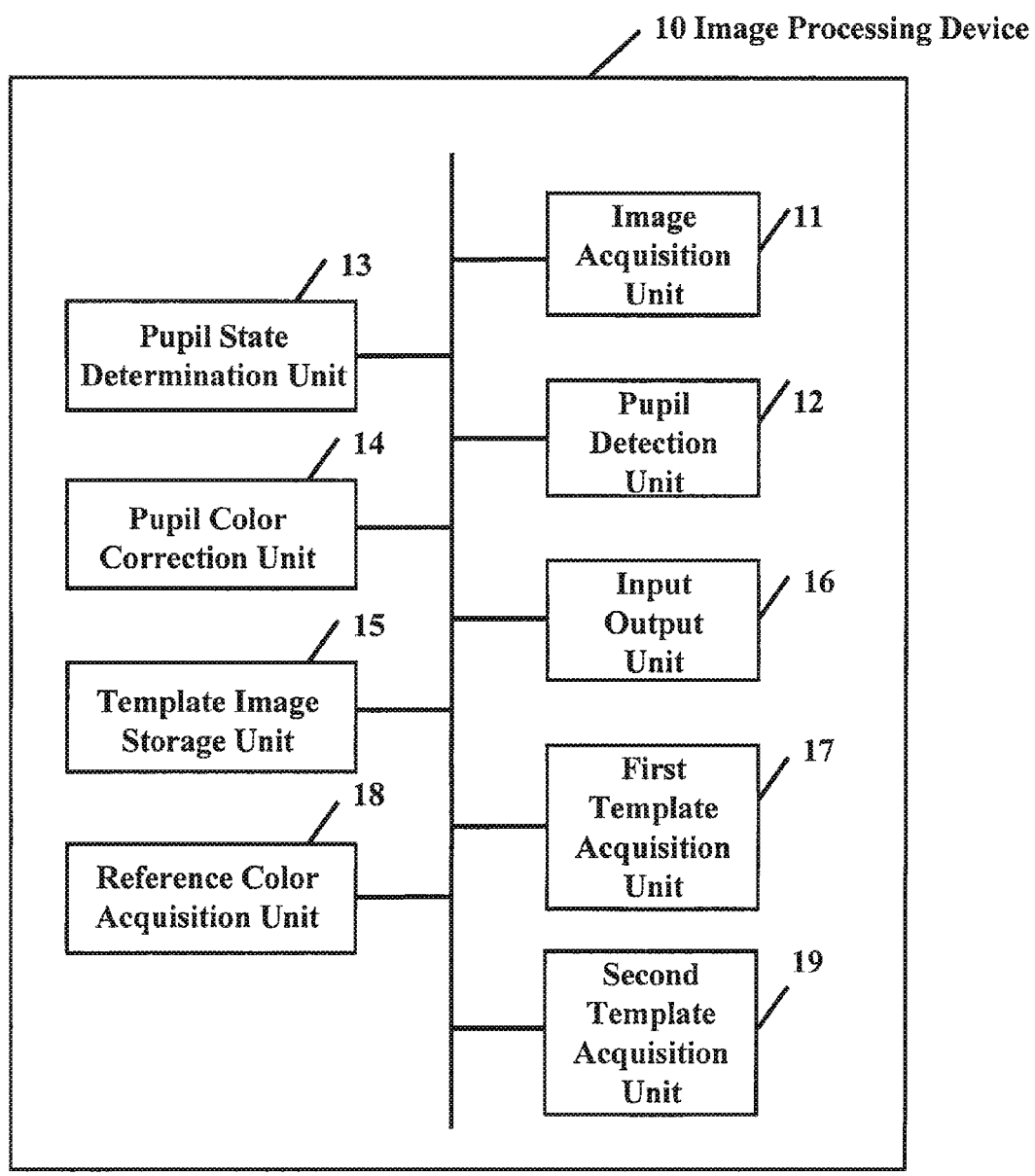
FIG. 1 illustrates a system configuration of an image processing device according to one or more embodiments of the present invention.

An image processing device according to one or more embodiments of the present invention detects color defects or brightness defects occurring in the pupil of a person included in an image and corrects said defects. FIG. 1 illustrates a system configuration of an image processing device according to one or more embodiments of the present invention.

System Configuration

An image processing device 10 according to one or more embodiments of the present invention includes an image acquisition unit 11, a pupil detection unit 12, a pupil state determination unit 13, a pupil-color correction unit 14, a template image storage unit 15, and an input output unit 16.

The image acquisition unit 11 acquires images of the subject being processed (i.e., an image including a person's face, referred to below as a face image), and is typically a storage device such as a hard drive or a flash memory. The image acquisition unit 11 may be capable of acquiring an image external to the device (e.g., via an interfaced device or via a wireless communication device), or may be capable of photographing an image via a lens and an imaging element.

The pupil detection unit 12 extracts a region corresponding to a person's pupil from the face image acquired by the image acquisition unit 11. More specifically, the pupil detection unit 12 detects a person's face from the image, clips an area including the person's eyes, identifies the location of the eyes in said area, and determines the center point of the pupil. The pupil detection unit 12 may also extract a circular region where the center point of the pupil is the center thereof (referred to below as the pupil region). The specifics of extracting the pupil region is described later. Note, in this description the term "pupil region" is used to indicate a region of a predetermined size with the center point of the pupil as the center coordinate thereof.

The pupil state determination unit 13 determines the state of the pupil region extracted by the pupil detection unit 12. More specifically, the pupil detection unit 12 determines whether or not red eye, yellow eye, or halation occurred. The particulars of how a determination is made are described later. Note that yellow eye is a color defect where the pupils are reproduced as yellow due to the same factors as a red eye.

The pupil-color correction unit 14 corrects for red eye, yellow eye, and halation on the basis of the determination results from the pupil state determination unit 13. In one or more embodiments of the present invention, the pupil-color correction unit 14 uses the later-described template image stored in the template image storage unit 15 to correct halation. A first template acquisition unit 17 acquires a first template image which is a correction template image, a reference color acquisition unit 18 acquires a reference color corresponding to the person from a face image, and a second template acquisition unit 19 generates a second template image using the first template image and the reference color. This process is described in detail later. Red eye and yellow eye may be corrected using already-known techniques.

The region subject to correction by the pupil-color correction unit 14 does not need to be strictly identical to the pupil region. For instance, the region to be corrected may be a region in the pupil region where the region corresponding to the skin is removed, or a region where regions except the iris are removed.

Figure 2:
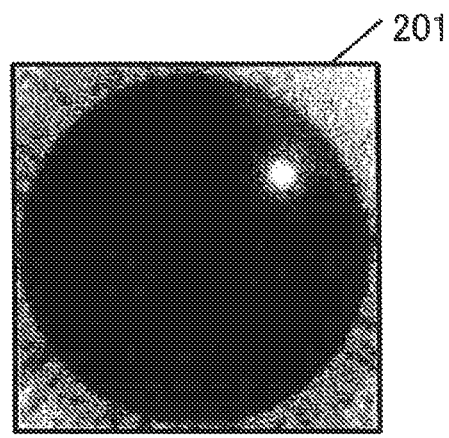
FIG. 2 illustrates an example of a template image according to one or more embodiments of the present invention.
Figure 2:
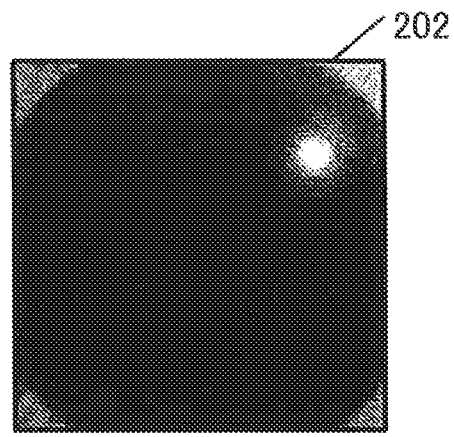

The template image storage unit 15 stores an image used for correcting the halation (a template image). In one or more embodiments of the present invention, a grayscale image corresponding to a normal pupil with no halation present is stored as the template image; in addition to adjusting the coloring and brightness of the template image in accordance with the face image that will be corrected, the template image is composited with the face image to correct the halation. FIG. 2 illustrates an example of a template image stored in the template image storage unit 15. The template image is a 256-level grayscale image representing the average pupil among a plurality of people.

As long as a region where halation is likely is included, the template image may be an image containing the entire iris as exemplified by element 201, or an image containing just a portion of the iris as exemplified by element 202. According to one or more embodiments of the present invention, the template image centered on the center point of the eyes (pupils). This facilitates aligning the template image with the face image of the image being processed. The particulars of correcting a face image containing halation is described later.

Note that the template image may include luminance information for only the iris portion. A region corresponding to the whites of the eyes may be made transparent, for example.

The input output unit 16 accepts input commands from a user and presents information to the user. More specifically, the input output unit 16 may be constituted by a touch screen panel and a control unit therefore, as well as a liquid crystal display and a control unit therefore. A single touch screen display panel in one or more embodiments of the present invention constitutes the touch screen panel and the liquid crystal display.

The various components described above may be implemented in dedicated hardware or as software modules. The various components may also be implemented in Field Programmable Gate Arrays (FPGAs) or Application Specific Integrated Circuits (ASICs), or in a combination of these.

When the above-described components are implemented in software, a program saved in an auxiliary storage device may be loaded into a main storage device, and the program executed on a CPU to operate each of the components. The CPU, the auxiliary storage device, and the main storage device are not shown.

First, the conventional techniques are described.

Figure 3:
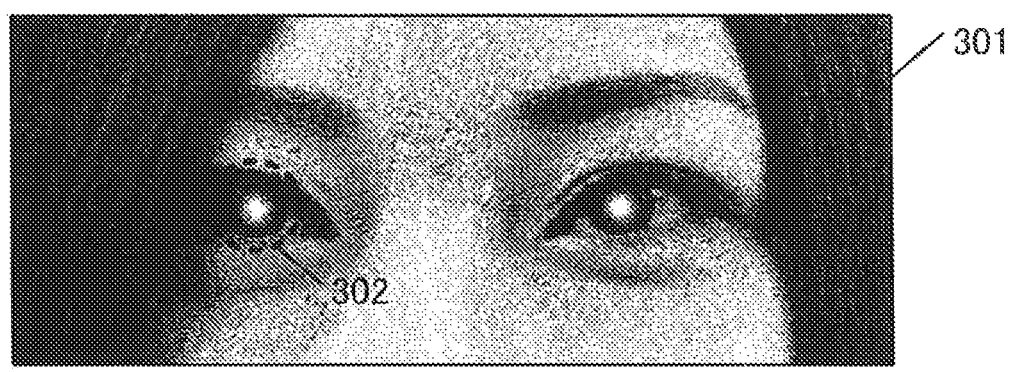
FIG. 3 illustrates a portion of a face image in one or more embodiments of the present invention.

The image 301 illustrated in FIG. 3 is a partial clipping (i.e., the region around the eyes) of a face image acquired by the image acquisition unit 11. Further, element 302 is the region corresponding to a pupil (a pupil region). Here, it is assumed there is halation in the pupil region 302 due to the reflection of the light from a strobe.

When halation occurs, the luminance level information in the region is lost. That is, the luminance information must be extrapolated when attempting to correct the halation effect. For instance, generally the sort of template image illustrated in FIG. 2 can be composited with (pasted onto) the face image to correct halation. However, the following usually occur when attempting to paste the template image.

The first is related to the hue. Human eyes have a variety of iris colors; therefore if a template image having a matching iris color is unavailable, the iris may be corrected to a color that differs from the original. Otherwise, the iris may be corrected in a way that the right and left eyes have a different iris color, resulting in an unnatural appearing image. Despite that, preparing template images in advance to match all iris colors is impractical.

The second is related to the brightness. The template image is prepared with a predetermined luminance. Therefore, if the template images is pasted as is, this results in an unnatural-looking image because the template image does not match the surrounding area.

An image processing device according to one or more embodiments of the present invention acquires the color of a pixel present in the iris portion of the pupil region containing no halation, and sets this color as a reference color (referred to below as a reference correction color) which is used in correcting the image. Additionally, the image processing device according to one or more embodiments of the present invention uses the correction reference color to correct the luminance of the template image, and to convert the template image which is a grayscale image to a color image. The specifics of the methods used are described below.

Detecting Halation

Before explaining the technique used to correct the template image, the technique used to detect halation within the pupil region, and to extract the region containing halation (referred to below has the halation region) is described.

Figure 4:
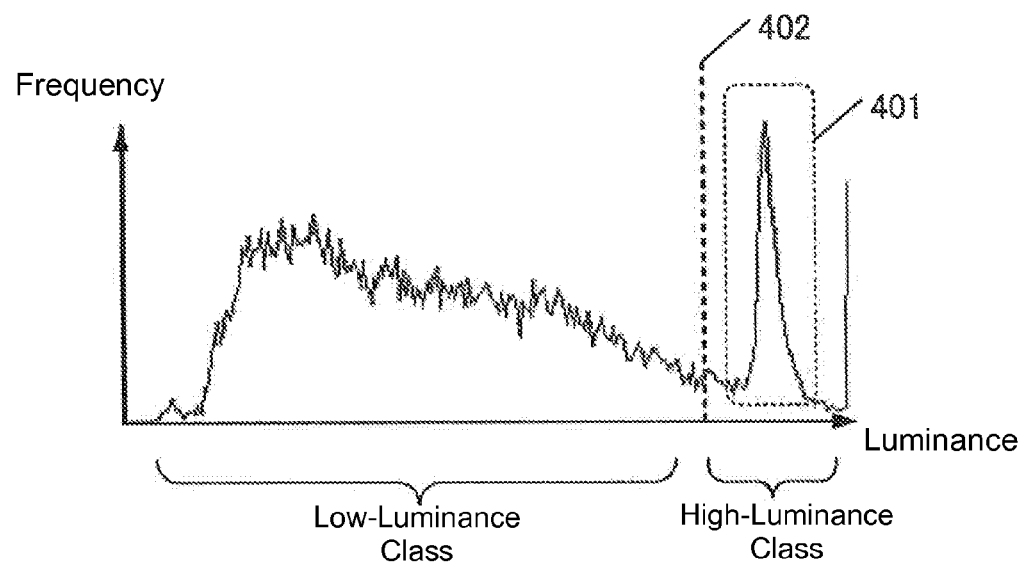
FIG. 4 is an example of a luminance value histogram used in one or more embodiments of the present invention.

FIG. 4 is a brightness value histogram of pixels included in the pupil region 302. While the image 301 is an RGB image, the histogram illustrates RGB values converted to luminance values in order to simplify the explanation. The horizontal axis of the histogram represents the luminance values, while the vertical axis represents the frequency (number of pixels).

The luminance distribution may be used to determine whether or not halation occurred in the pupil region. When halation occurs, the luminance distribution spikes in the high luminance region. In this example the portion represented by the element 401 is a spiked portion in the luminance distribution indicating halation. In addition, a spike in the high luminance portion of the luminance distribution can be determined based on the proportion of pixels having a luminance value that exceeds a threshold. For example, the image processing device may determine that halation occurred when no less than a predetermined proportion (e.g., no less than 20%) of the pixels contained in the pupil region 302 have a high luminance value greater than or equal to the threshold 402.

The threshold 402 used here may be a fixed value, but according to one or more embodiments of the present invention, is established using discriminant analysis. Discriminant analysis is used in the binarization process to establish an optimal threshold. More specifically, discriminant analysis may be used to separate the luminance value histogram into a low-luminance class and a high-luminance class, calculate a degree of separation between the classes on the basis of mean values and separation values for those classes, and calculate a threshold which yields the maximum degree of separation between the classes. Given that discriminant analysis is a known technique, a detailed description thereof is omitted. Note that the dynamic setting of the threshold in this manner improves the accuracy of determining whether or not halation occurred in the pupil region.

Applying the discriminant analysis to the face image results in a region composed of the pixels classified into the high-luminance class which can be estimated as the halation region. Note that, according to one or more embodiments of the present invention, a region is not determined as the halation region when the halation region is too large, (e.g., larger than the pupil region), or too small (e.g., when the number of pixels within the region is less than or equal to a predetermined threshold).

Beyond this, when degree of separation for the luminance distribution inside the pupil region is less than a predetermined value, further determination processing may be carried out to assess whether or not halation occurred. A small degree of separation between the classes implies that a proper assessment cannot be made using discriminant analysis.

Acquiring Reference Correction Color and Reference Luminance Correction Value

Next, a method of acquiring a reference correction color is described.

Figure 5:
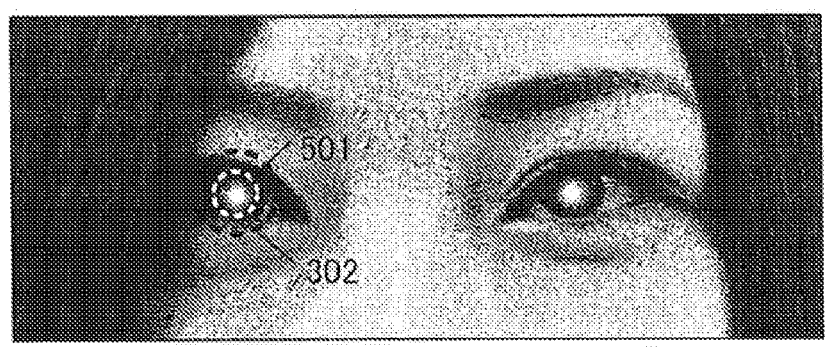
FIG. 5 illustrates an example of a halation region.

It is assumed here that a halation region 501 is selected relative to the pupil region 302 as illustrated in FIG. 5. In the example, a region corresponding to the iris portion having no halation is extracted by removing the halation region 501 from the pupil region 302.

However, other than the iris, the pupil region 302 is likely to include the sclera (whites of the eyes) and the skin, therefore the necessary processing for removing the sclera and the skin is executed. More specifically, the regions corresponding to the sclera and the skin are extracted on the basis of color information, and those regions removed. Note that besides the color information, the information on the shape and arrangement of the organs may be used for the removal process.

The above-described process thus extracts a region corresponding to the iris. In one or more embodiments of the present invention, the color of a pixel present in the region (that is, the iris color) is selected as a reference correction color. In the example, the reference correction color represented in RGB values is $C_{eye}$ ($R_{eye}$, $G_{eye}$, $B_{eye}$). For instance, for a person having brown irises, the reference correction color is a system of browns, and for a person having blue irises the reference correction color is a system of blues. When there is a plurality of pixels to be extracted, the average of the colors may be selected or another method of specifying the color may be used.

There are cases when, for instance, the halation affects the entire pupil region, and the iris color cannot be acquired. In this case, in addition to extracting a region near the pupil region where the skin is present (referred to below as the skin region), the reference correction color may be obtained through conversion using Formula 1. The variables $R_{skin}$, $G_{skin}$, $B_{skin}$ in Formula 1 represent the color of the pixels present in the skin region in RGB values.

$$R_{eye} = 0.0004 \times R_{skin}^2 + 0.4560 \times R_{skin}$$

$$G_{eye} = 0.0004 \times G_{skin}^2 + 0.6489 \times G_{skin}$$

$$B_{eye} = -0.0006 \times B_{skin}^2 + 0.7841 \times B_{skin} \quad \text{Formula 1}$$

The reference correction color is used in one or more embodiments of the present invention to generate a reference luminance correction value $Y_{eye}$. The reference luminance correction value is used to correct the luminance of the template image when compositing the template image, where the reference correction color merely substitutes for the luminance value. The luminance value is computed taking into account how the brightness of each of the colors red, green, and blue are perceived, and may be obtained using Formula 2.

$$Y_{eye} = 0.299 \times R_{eye} + 0.587 \times G_{eye} + 0.114 \times B_{eye} \quad \text{Formula 2}$$

Conversion of the Template Image

Next is described the method whereby the luminance of the template image is adjusted using the acquired reference correction color and the acquired reference luminance correction value, and the template image converted to a color image.

In one or more embodiments of the present invention, the luminance of the template image is first adjusted using Formula 3. Note, L is the number of pixels in the horizontal direction of the template image, M is the number of pixels in the vertical direction of the template image, $Y_{template\,(i,j)}$ is the luminance at a coordinate (i,j) in the template image, $Y_{avg}$ is an average luminance inside the iris in the template image, and $Y_{eye}$ is the reference luminance correction value.

In this manner, weighting the average luminance $Y_{avg}$ inside the iris in the template image, and the reference luminance correction value $Y_{eye}$ which depends on the person, and adjusting the luminance value of the template image suitably adjusts the luminance of the template image.

$$Y_{i,j} = \sum_{i=1}^{L} \sum_{j=1}^{M} \left( Y_{template(i,j)} - \frac{1}{2} Y_{avg} + \frac{1}{2} Y_{eye} \right) \quad \text{Formula 3}$$

The above processing thus obtains a template image $Y_{i,j}$ with an adjusted luminance.

Next is described the process of converting the luminance-adjusted template image $Y_{i,j}$ (referred to below simply as template image $Y_{i,j}$) into a color image. In one or more embodiments of the present invention the combination of RGB values whose luminance would match the luminance of the template image $Y_{i,j}$ is computed using the reference correction color.

Figure 6:
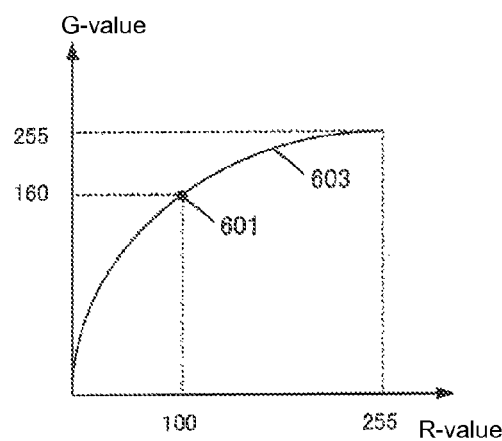
FIG. 6 is a diagram for explaining an approximated curve representing the correspondence relationship between R- and G-values, and R- and B-values.
Figure 6:
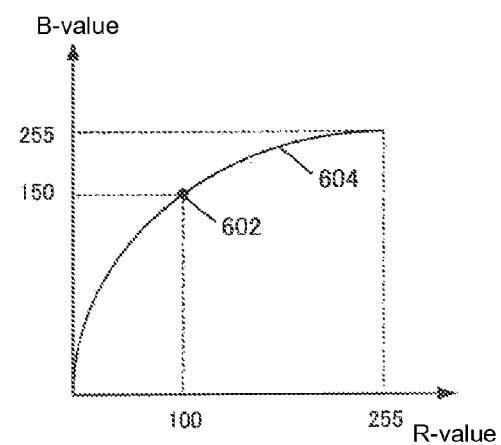

(1) Computing an Approximated Curve for the Ratio of the R- and G-Values, and the Ratio of the R- and B-Values First, the combination of the R- and G-values, and the combination of the R- and B-values are acquired from the reference correction color. The process provides an example of when the reference correction color $C_{eye}$ ($R_{eye}$, $G_{eye}$, $B_{eye}$) is (100, 160, 150). In this case, when the values are plotted, the combination of the R- and G-values, and the combination of the R- and B-values are as indicated by points 601 and 602 respectively on the graph illustrated in FIG. 6.

Next, an approximated curve is drawn passing through three points: the plotted points, the point (0, 0), and the point (255, 255). Any method may be used to obtain the approximated curve. The approximated curves 603 and 604 are thus obtained.

(2) Using a Binary Search to Specify RGB Values

Next, a combination of RGB values is calculated that match the luminance value in the image being processed and the luminance value in the template image $Y_{i,j}$.

Figure 7:
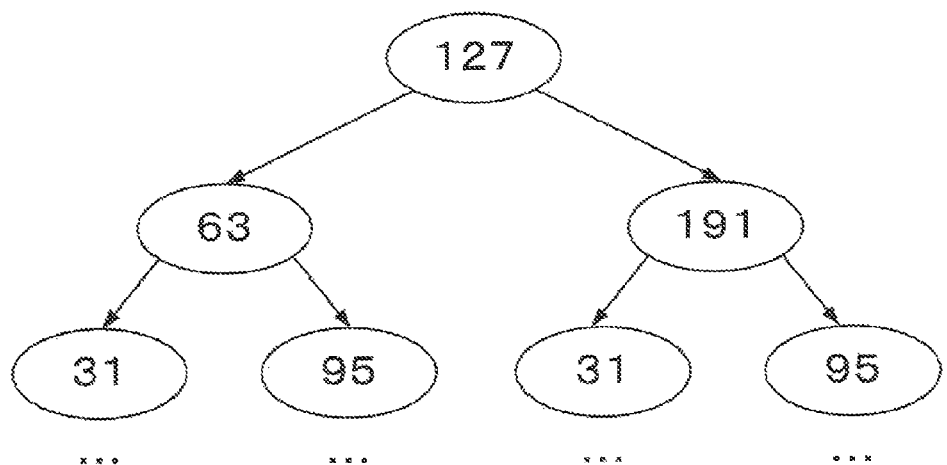
FIG. 7 is a diagram for describing the binary search method.

First, the R-value is set to 127, and the corresponding G- and B-values calculated from the approximated curve. The luminance value corresponding to a combination of the aforementioned RGB values is then acquired using Formula 2. The luminance value calculated is compared to the luminance value at $Y_{i,j}$, and the R-value modified if there is a difference between the luminance values. In practical terms, as illustrated in FIG. 7, with the value 127 as the start point, the R-value narrowed down while updating the R-value along a direction where the difference in luminance values becomes smaller. For example, the R-value is increased if the luminance value calculated is less than the luminance value at $Y_{i,j}$.

Using this kind of processing it is possible to eventually identify a combination of RGB values corresponding to a target luminance value. Applying the aforementioned processing to all the pixels in the template image $Y_{i,j}$ also converts the grayscale template image into a color image.

Compositing the Images

A correction region is then created. The correction region is the previously described region including halation onto which the colorized template image is pasted. The correction region may be identical to the pupil region, for instance, or may be a region having the same size as the template image and centered on the pupil.

There are cases where the correction region includes unwanted regions such as the skin; therefore, the processing for removing these unwanted regions may also be carried out. For example, the unwanted regions (e.g., a skin color region) can be extracted using color information and the extracted region deleted. At this point, besides the color information, information on the shape and the arrangement of the organs may be used to delete the unwanted regions. Different standards may be used in a plurality of processes and the results of the processes merged. For instance, there may be a process for deleting a region on the basis of the color information; a process for deleting a region on the basis of shape information; and a process for merging the remaining regions. Any desired element may be used so long as the element can create a correction region of the appropriate shape.

The colorized template image is then pasted onto the correction region. Note, the regions besides the correction region are masked. Pasting may be carried out taking into account the center of the pupil. Additionally the diameter of the iris in the image being corrected may be measured when pasting, and the template image resized to match the diameter measured.

Process Flowchart

Next, the processing executed to realize the above-described functions is explained.

Figure 8:
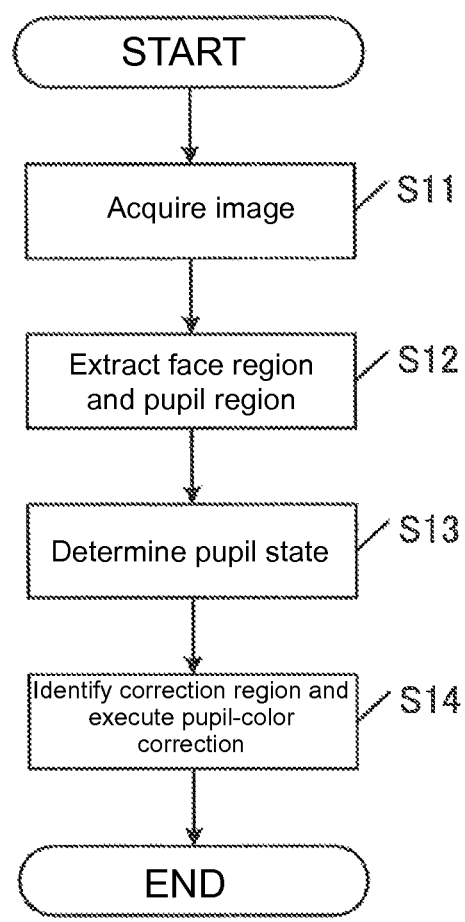
FIG. 8 is a flowchart of the processing executed by the image processing.

FIG. 8 is a flowchart of the processes in the image processing device 10 according to one or more embodiments of the present invention. The process is initiated through a command from a user (e.g., a command to read a stored image). In one or more embodiments of the present invention, red-eye and yellow-eye correction are carried out simultaneously with the halation correction. The red-eye and yellow-eye correction processes will be detailed as needed.

First, in step S11, the image acquisition device 11 acquires the image. In one or more embodiments of the present invention, a preliminarily stored image is acquired from a storage device; however, the image may also be acquired via a communication unit, or an imaging unit.

Figure 9:
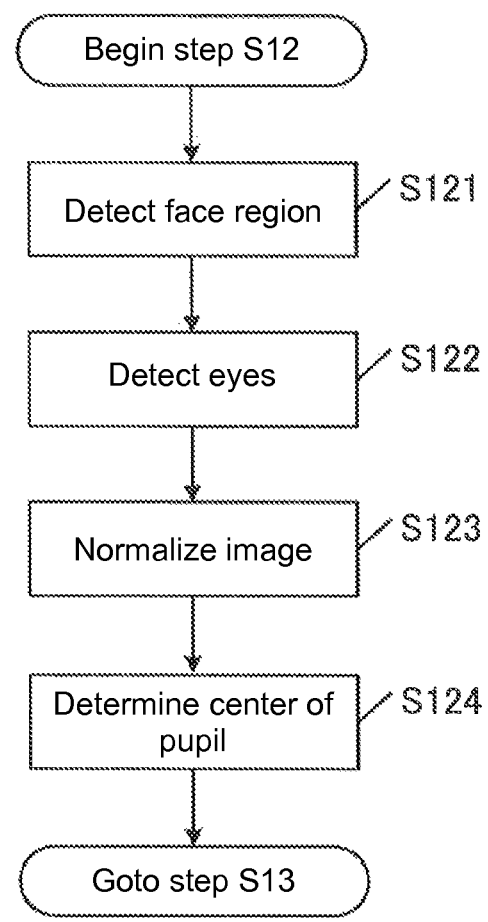
FIG. 9 is a flowchart for explaining in detail the process of extracting a face region and a pupil region.

Next, in step S12, the pupil detection unit 12 extracts regions from the acquired image corresponding to a face and pupils. FIG. 9 is a flowchart detailing the processing in step S12.

Referring to FIG. 9, in step S121, a square region (face region) corresponding to a face included in the image is extracted. Methods for extracting a face region from an image are already known and thus a detailed explanation thereof is omitted.

Next, in step S122, the eyes contained in the face region are detected. More specifically, feature points corresponding to the outer corner of the eyes, the inner corner of the eyes, the center of the eyes, and the like are detected. Note that if feature point detection fails, the eyes may be detected using filtering and then matching.

Next, the image is normalized in step S123. More specifically, the face region is clipped from the image and a square image containing the eyes is generated with a predetermined size. At this point, the desired extrapolation technique may be used change the resolution of the square image. The image may also be rotated if the face region is not horizontal. This step specifies a region for locating for the pupils.

Finally, in step S124, the image processing device searches for the center point of the pupil located inside the eye that were detected. The center point of the pupil may be obtained by, for instance, converting the RGB image corresponding to the face region into a monochromatic image, and performing matches using the luminance, and calculating a score.

Once the center point of the pupil is determined, a circular region of a predetermined size is generated centered at the center point to create the pupil region. The predetermined size may be a fixed size, or may be a different size for each person. Additionally, the shape of the region may be a circle, an ellipse, or another shape.

Figure 10:
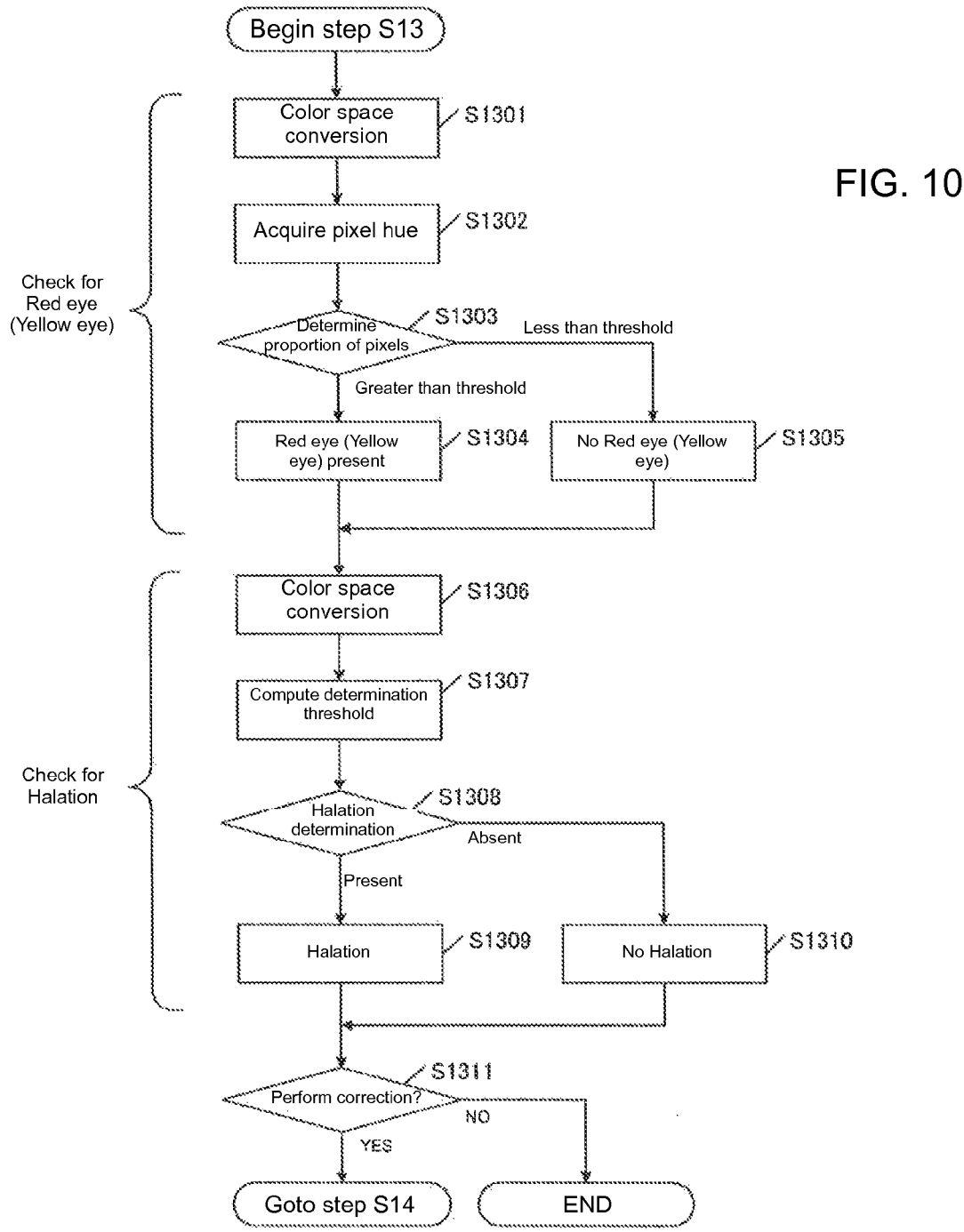
FIG. 10 is a flowchart for explaining in detail the process of determining the state of the pupil.

Returning to FIG. 8, next, in step S13, the pupil state determination unit 13 determines the state of the pupil region. There are three types of color defects and brightness defects that can occur in the pupil: red eye, yellow eye, and halation. Therefore, this step is for determining which of these defects is present. FIG. 10 is a flowchart detailing the processing that occurs in step S13.

Steps S1301 through S1305 check whether a color defect is visible in the pupil region, i.e., whether red-eye or yellow-eye were generated.

First, the image is converted from an RGB to a Lab color space in step S1301.

Next, in step S1302, the pupil state determination unit 13 determines whether any of the following conditions applies to each pixel included in the pupil region:

θ is between 350° to 55°, and d is 0.2 or greater
θ is between 315° to 350°, and d is 0.7 or greater The variable θ represents the hue angle in the CIE Lab color system, and the variable d is a value representing the saturation (i.e., the distance from the origin). Additionally, the above-mentioned conditions provide examples of cases where the maximum value on the a- and b-axes is 1. These conditions are used to determine whether or not a pixel is in a system of reds.

Next, in step S1303, the pupil state determination unit 13 determines whether the number of pixels satisfying the above mentioned conditions is a predetermined proportion (e.g., 10%) or greater of the number of pixels in the pupil region. If the number of pixels satisfying the above-mentioned conditions is the predetermined proportion or greater, the pupil state determination unit determines there is red-eye in the pupil region (S1304). However, if the number of pixels satisfying the above-mentioned conditions is less than the predetermined proportion, the pupil state determination unit 13 determines there is no red-eye in the pupil region (S1305).

The yellow-eye determination process is identical to the red-eye determination process. The color conditions corresponding to gold eye (yellow eye) may be substituted in during the yellow-eye determination process. For instance, the following condition may be used.

θ is between 65° to 115°, and d is 0.2 or greater

In the example, the image is converted to the Lab color space and the determination made on the basis of the hue, however other methods may be used to make determinations on the basis of the hue.

The steps S1306 through S1310 check for halation in the pupil region.

First, the image is converted from an RGB color space to gray scale in step S1306.

Next, in step S1307, using discriminant analysis, a threshold t is calculated for classifying the luminance values of the pixels contained in the pupil region into a high-luminance class and a low-luminance class.

A halation determination process is carried out in step S1308 using the threshold t computed in step 1307. Namely, the proportion of the number of pixels having a luminance that exceeds the threshold t in relation to the entire region is obtained. If the proportion obtained is greater than a predetermined proportion (step S1309) the pupil state determination unit determines halation is present, and if the proportion obtained is less than the predetermined threshold the pupil state determination unit determines there is no halation (step S1310). At this point, if the degree of separation obtained in step S1308 is lower than a predetermined threshold, i.e., if there is an unsatisfactory separation between the high-luminance class and the low-luminance class in the luminance distribution, an additional determination processes may be carried out to finally determine the presence or absence of halation.

If the pupil state determination unit determines that any of the defects are present as a result of the red-eye and yellow-eye check, and halation check, processing transitions to step S14 (step S1311). If none of these defects are present, processing terminates.

Figure 11:
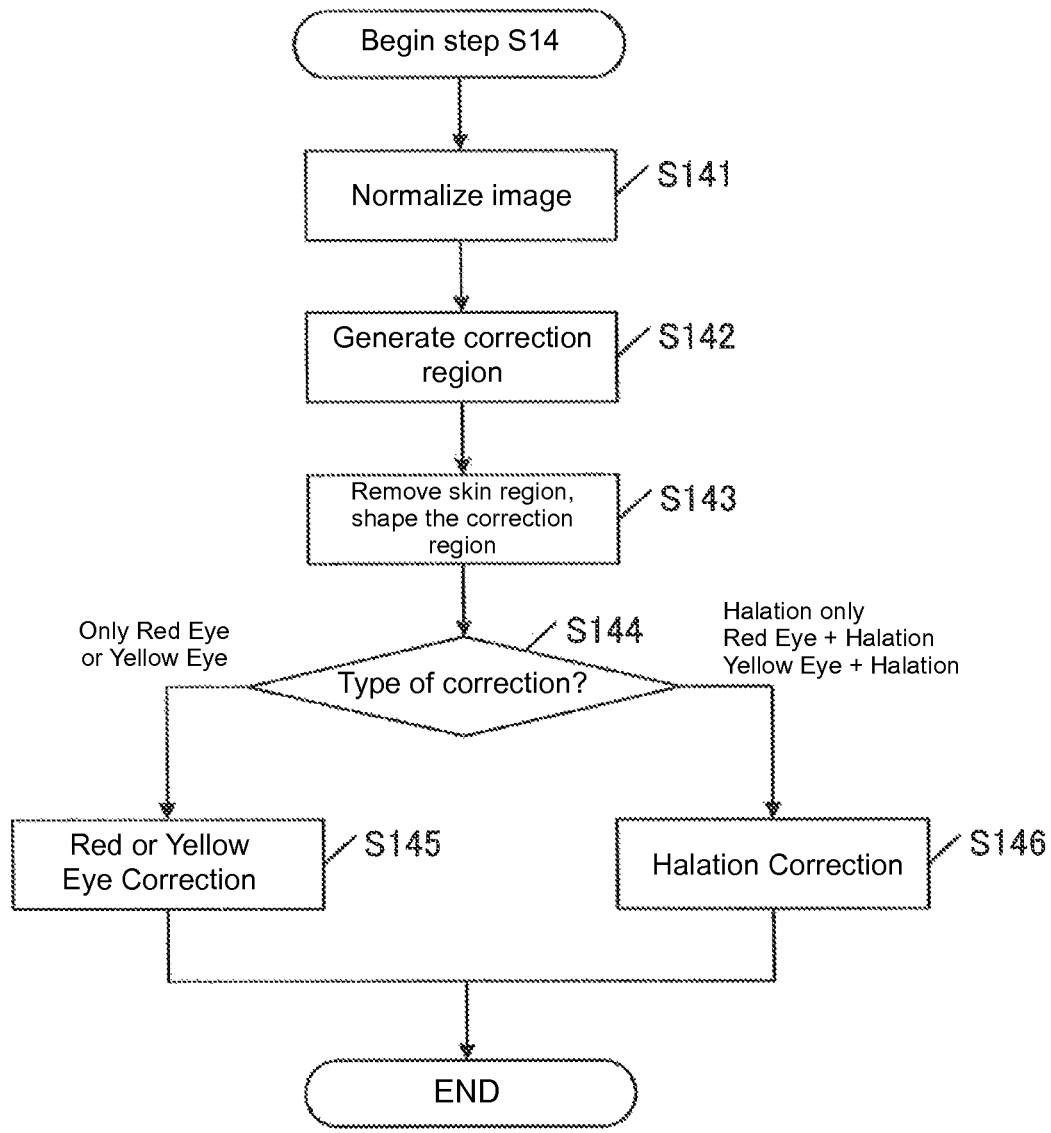
FIG. 11 is a flowchart for explaining in detail the process of correcting an image.

Returning to FIG. 8, next, in step S14, the pupil-color correction unit 14 corrects the pupil region. FIG. 11 is a flowchart detailing the processing in step S14.

First, the pupil-color correction unit 14 normalizes the image in step S141. More specifically, the face region is clipped from the image and a square image is generated with a predetermined size centered on the center coordinate of the pupil. At this point, a desired extrapolation technique may be used to change the resolution of the square image. The image may also be rotated if the face region is not horizontal.

Next, in step S142, a correction region is generated using the above-described method. For instance, a region identical to the pupil region is established as the correction region. Execution of step S143 extracts a region corresponding to only the inner parts of the eye.

As previously described, the correction region generated in step S142 is likely to contain a region that does not need correction, such a region corresponding to the skin, and the like. Therefore, in step S143 the pupil-color correction unit 14 shapes the correction region by removing a region that does not need correction. Executing step S143 thereby extracts a region corresponding to the inner parts of the eye.

Processing branches at step S144 in accordance with the type of defect needing correction. The determination made in step S13 may conceivably result in one of three patterns (1) red-eye or yellow-eye correction, (2) halation correction, or (3) both sets of corrections. While the red-eye or yellow-eye correction (1) may be handled by simply correcting the color tone, halation destroys the luminance information, and thus the halation correction (2) requires extrapolation of the luminance information. No luminance information is available when both set of corrections need to be made, and thus halation correction should be prioritized.

Accordingly, if, as a result of the determination, the above-described red-eye or yellow-eye correction is required, red-eye or yellow-eye correction is performed (step S145). If, as a result of the determination, halation correction (2) or both sets of corrections (3) are required, halation correction is performed (step S146).

Red-eye and yellow-eye corrections can be carried out using already-known techniques for modifying the color tone. Further, as previously described, halation correction may be carried out by adjusting the luminance of and colorizing a template image, and then pasting the template image onto the correction region. In cases where both sets of corrections need to be performed, the pasting of the template image may be used to simultaneously correct a region with a color defect. Of course, correcting the halation and correcting the color defect may be carried out independently.

As described above, an image processing device according to one or more embodiments of the present invention may compute a reference correction color corresponding to a person, use the reference correction color to adjust the luminance of a template image and colorize the template image. Consequently, the halation may be corrected to a natural-appearing color and brightness regardless of the person's iris color, and regardless of the brightness of the face image in the image being corrected.

Modification Examples

The above embodiments are merely examples and can be modified and implemented as appropriate so long as the modifications remain within the spirit and scope of the invention.

For example, one or more of the above embodiments includes processing an image stored on a storage device. However, the image to be processed may be acquired from outside the image processing device via a wired or wireless network and does not need to be acquired from a storage device.

Additionally, one or more embodiments of the invention may be implemented as an imaging device provided with a function for correcting a region in which there is a brightness defect, where the imaging device is a combination of an imaging unit that photographs an image, and the above-described image processing device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An image processing device for correcting at least a portion of a face image containing a person's face, the image processing device comprising:
   an image acquisition unit that acquires a face image;
   a region extractor that extracts a pupil region containing a pupil from the face image;

a determination unit that determines a presence or absence of halation in the pupil region;

a first template acquisition unit that acquires a first template image which is a correction template image;

a reference color acquisition unit that acquires a reference color corresponding to the person from the face image;

a second template acquisition unit that generates a second template image using the first template image and the reference color; and a correction unit that composites the second template image with at least the region in the pupil region where the halation occurred to correct the halation.

2. The image processing device according to claim 1, wherein the first template image is a grayscale image; and wherein the second template acquisition unit uses the reference color to convert the first template image into a color image and uses the color image as the second template image.

3. The image processing device according to claim 2, further comprising:

a correction value computing unit that computes a correction value on the basis of the reference color, the correction value used for matching the luminance of the first template image to the face image; and wherein the second template acquisition unit uses the correction value to adjust the luminance of the first template image, and converts the first template image into a color image.

4. The image processing device according to claim 1, wherein the reference color acquisition unit extracts a region from the pupil region corresponding to the iris in which no halation occurred, and acquires a reference color from a pixel contained in the region.

5. The image processing device according to claim 2, wherein the reference color acquisition unit extracts a region from the pupil region corresponding to the iris in which no halation occurred, and acquires a reference color from a pixel contained in the region.

6. The image processing device according to claim 3, wherein the reference color acquisition unit extracts a region from the pupil region corresponding to the iris in which no halation occurred, and acquires a reference color from a pixel contained in the region.

7. The image processing device according to claim 4, wherein when there is no region within the pupil region that corresponds to the iris and in which no halation has occurred, the reference color acquisition unit extracts a region corresponding to the person's skin from the face image, and acquires the reference color on the basis of the color of a pixel contained in the region.

8. An image processing method performed in an image processing device for correcting at least a portion of a face image containing a person's face, comprising:

acquiring a face image;

extracting a pupil region containing a pupil from the face image;

determining a presence or absence of halation in the pupil region;

acquiring a first template image which is a correction template image;

acquiring a reference color corresponding to the person from the face image;

generating a second template image using the first template image and the reference color; and compositing the second template image with at least the region in the pupil region where the halation occurred to correct the halation.

9. A program stored on a non-transitory computer-readable medium that causes a computer to perform an image processing method for correcting at least a portion of a face image containing a person's face, comprising:

acquiring a face image;

extracting a pupil region containing a pupil from the face image;

determining a presence or absence of halation in the pupil region;

acquiring a first template image which is a correction template image;

acquiring a reference color corresponding to the person from the face image;

generating a second template image using the first template image and the reference color; and compositing the second template image with at least the region in the pupil region where the halation occurred to correct the halation.

* * * * *